United States Patent

[11] 3,579,251

[72] Inventor Ralph E. Lovelace
North Reading, Mass.
[21] Appl. No. 739,323
[22] Filed June 24, 1968
[45] Patented May 18, 1971
[73] Assignee Sylvania Electric Products Inc.

[54] VIDEO SIGNALLING PROCESSING APPARATUS WITH NOISE PROTECTION
13 Claims, 3 Drawing Figs.

[52] U.S. Cl. .......... 178/7.3
[51] Int. Cl. .......... H04n 3/16
[50] Field of Search .......... 178/6 (NS), 7.35, 7.3 (E), 7.5 (S), 7.5 (E); 328/147

[56] References Cited
UNITED STATES PATENTS
3,441,669 4/1969 Janson et al. .......... 178/6N.S.
3,443,029 5/1969 Wolfe .......... 178/7.3E

*Primary Examiner*—Robert L. Griffin
*Assistant Examiner*—Donald E. Stout
*Attorneys*—Norman J. O'Malley, Elmer J. Nealon and David M. Keay

ABSTRACT: Video signal-processing apparatus which amplifies the composite video signal from the video detector of a television receiver and charges a capacitance to the peak voltage of the synchronizing pulses. The composite video signal is compared with the voltage stored in the capacitance by a comparator and an output pulse is produced when the voltage of the composite video signal is high enough to indicate the presence of a synchronizing pulse. The composite video signal is also compared with the stored voltage by a second comparator, and a noise-cancelling signal which prevents noise from affecting the voltage stored on the capacitance or the first comparator is generated when the voltage of the composite video signal is high enough to indicate the presence of noise.

INVENTOR.
RALPH E. LOVELACE

BY David M. Key

AGENT.

INVENTOR.
RALPH E. LOVELACE

BY David M. Kay

AGENT.

INVENTOR.
RALPH E. LOVELACE

BY David M. Keay

AGENT.

VIDEO SIGNALLING PROCESSING APPARATUS WITH NOISE PROTECTION

BACKGROUND OF THE INVENTION

This invention relates to electrical apparatus for separating periodic peak pulses from a signal. More particularly, it is concerned with circuitry for separating the synchronizing pulses from the composite video signal in a television receiver.

In a television receiver the output from the video detector section includes synchronizing pulses as part of the composite video signal. The synchronizing pulses are separated from the composite video signal by the synchronizing circuits in order to provide the timing pulses for controlling the frequencies of the vertical and horizontal deflection oscillators. Synchronizing circuits have been developed employing vacuum tubes and discrete transistors as active components. Certain of these circuits have become standard in the television industry. However, these well-known circuits are not amenable to fabrication in the form of monolithic integrated circuits of the type in which a plurality of active and passive components are fabricates in a single wafer of semiconductor material to provide one or more circuit functions. Thus, these circuits are not adapted to take full advantage of the improvements in size, economy, and reliability which may be obtained by performing the desired electrical functions with monolithic integrated circuits.

SUMMARY OF THE INVENTION

Signal-processing apparatus in accordance with the invention which may be employed to separate the synchronizing pulses from a composite video signal is readily amenable to fabrication as a monolithic integrated circuit network. The apparatus includes an input circuit means which may be a differential amplifier circuit for amplifying composite video signals. An isolation circuit means is connected to the input circuit means and produces the composite video signal at first and second output connections. A peak detection means including a charge storage capacitance is connected to the first output connection of the isolation circuit means. The peak detection means includes circuit means which charges the charge storage capacitance to the peak voltage of the synchronizing pulses in the composite video signal.

The synchronizing pulses are separated from the composite video signal by a first comparison circuit means which has a first input connection connected to the second output connection of the isolation circuit means and a second input connection connected to the charge storage capacitance through circuit means which provide a voltage proportional to and slightly less than the voltage on the charge storage capacitance at the second input connection. The first comparison circuit means produces a first signal level at an output terminal thereof when the voltage of the composite video signal at its first input connection is less than the voltage at its second input connection, and produces a second signal level at its output terminal when the voltage of the composite video signal at its first input connection is greater than the voltage at its second input connection. Thus, the voltage at the output terminal is at the second signal level during the synchronizing pulses.

The apparatus also includes a second comparison circuit means for detecting noise. The second comparison circuit means has a first input connection connected to the input circuit means and a second input connection connected to the charge storage capacitance. The second comparison circuit means produces a predetermined signal condition at an output connection thereof when the voltage of the signal at its first input connection is greater by a predetermined amount than the voltage at the second input connection, indicating the presence of noise having a voltage greater than the peak voltage of the synchronizing pulses. The output connection of the second comparison circuit means is connected to a switching circuit means associated with the isolation circuit means. The switching means prevents the composite video signal from being produced at the first and second output connections of the isolation circuit means in response to the presence of the predetermined signal condition at the output connection of the second comparison circuit means.

Peak-detection means in accordance with the invention comprises a peak-detecting circuit which includes a differential amplifier means having first and second transistors with a constant current means connected to their emitters. The differential amplifier means causes the voltage at the collector of the second transistor to increase with increasing current flow through the first transistor. Transistor circuit means including third and fourth transistors having their emitters connected to the bases of the first and second transistors, respectively, cause increased current flow through the first transistor when the voltage at the base of the third transistor is greater than the voltage at the base of the fourth transistor and cause increased current flow through the second transistor when the voltage at the base of the fourth transistor is greater than the voltage at the base of the third transistor.

The peak-detecting circuit also includes emitter-follower means having a first emitter-follower transistor with its base connected to the collector of the second transistor and a second emitter-follower transistor with its base connected to the emitter of the first emitter-follower transistor and its emitter connected through a feedback resistance to the base of the fourth transistor. A capacitance has one terminal connected to a source of reference potential and the other terminal connected to the emitter of the second emitter-follower transistor. The emitter-follower means causes current flow therethrough into the capacitance when the voltage at the collector of the second transistor increases.

First comparison circuit means in accordance with the invention comprises a comparator circuit having a differential amplifier means with first and second amplifier transistors of one conductivity type. The comparator circuit also includes a constant current means having a first current control transistor of the opposite conductivity type with its collector connected through an impedance to a first source of reference potential and its emitter connected to a second source of reference potential. A second current control transistor of the one conductivity type has its emitter connected to the collector of the first current control transistor and its collector connected to the base of the first current control transistor. A current multiplying means includes a third current control transistor of the opposite conductivity type having its base connected to the base of the second current control transistor, its emitter connected to the second source of reference potential, and its collector connected to the bases of the first and second amplifier transistors. Thus, the voltage drop across the base-emitter junctions of the third and second current control transistors clamps the voltage at the collector of the first current control transistor fixing the current flow in the collector of the first current control transistor and consequently the base current of the second current control transistor. This current is multiplied by the current multiplying means and the resulting current flows in the collector circuit of the third current control transistor.

The comparator circuit also includes an output means connected to the collectors of the first and second amplifier transistors. The output means has an output transistor of the opposite conductivity type with its base connected to the collector of the first amplifier transistor, its emitter connected to the second source of reference potential, and its collector connected to an output connection. A current source means is connected to the collectors of the first and second amplifier transistors, the base of the output transistor, and the second source of reference potential. The output transistor is biased to conduction by the current source means when current flow through the first amplifier transistor is greater than current flow through the second amplifier transistor.

The differential amplifier means of the comparator circuit also includes a first input means connected to the emitter of the first amplifier transistor and a second input means connected to the emitter of the second amplifier transistor. The first and second input means cause greater current flow through the first amplifier transistor than through the second amplifier transistor when the voltage at the input connection of the first input means is greater than the voltage at the input connection of the second input means.

BRIEF DESCRIPTION OF THE DRAWINGS

Various objects, features, and advantages of signal-processing apparatus in accordance with the invention will be apparent from the following detailed discussion and the accompanying drawings wherein.

DETAILED DESCRIPTION OF THE INVENTION

General Description and Operation

Figure 1:
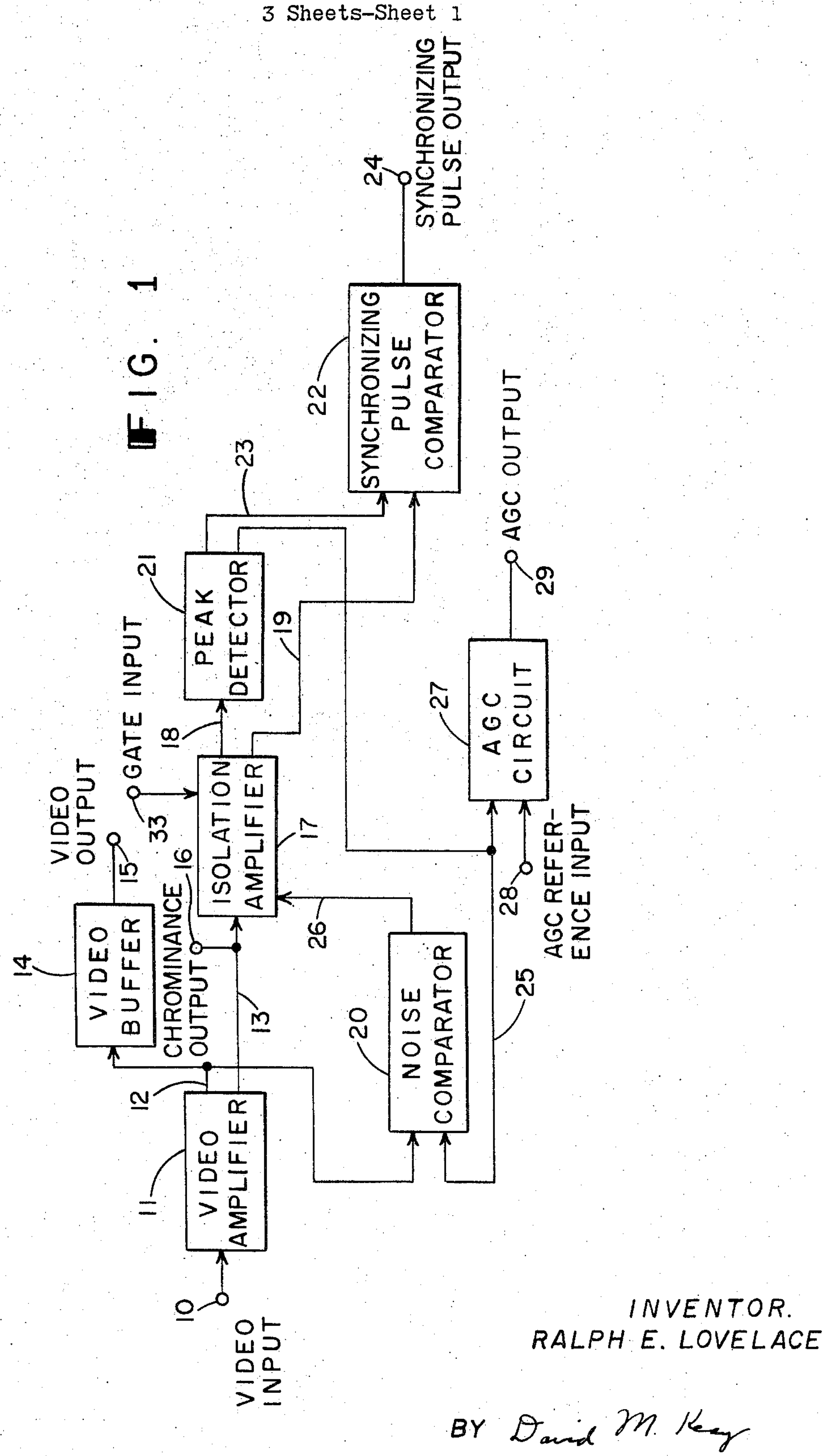
FIG. 1 is a block diagram of video signal-processing apparatus in accordance with the invention.
Figure 2:
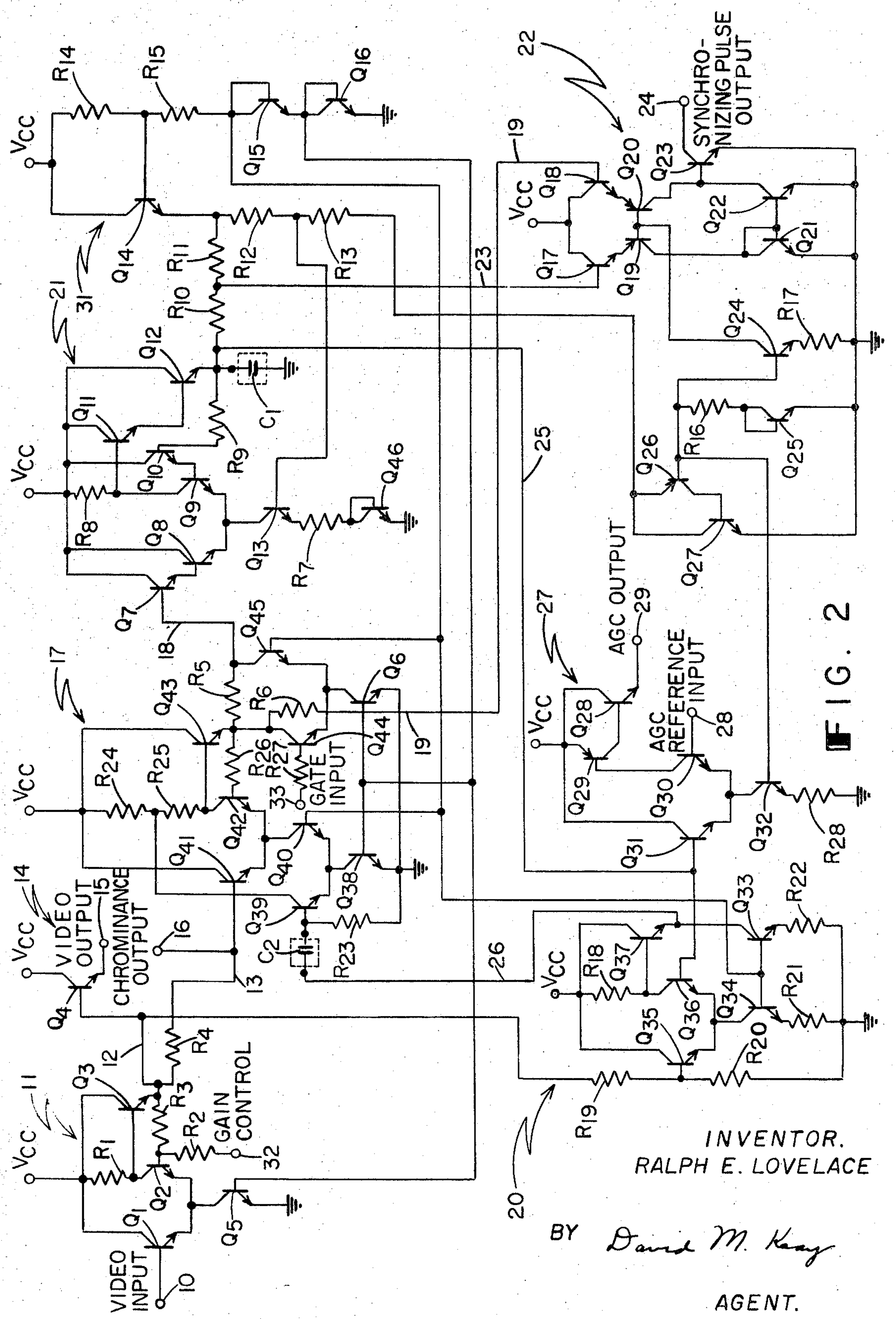
FIG. 2 is a detailed schematic circuit diagram of the apparatus of FIG. 1.

Video signal-processing apparatus in accordance with the invention as illustrated in the block diagram of FIG. 1 and in the detailed schematic circuit diagram of FIG. 2 is adapted to receive the composite video signal from the video-detector section of a television receiver, either black and white or color, at an input terminal 10. The composite video signal from the video detector includes the picture signal, the blanking pulses, and the synchronizing pulses, and, during color transmission, the chrominance information. The audio information may be removed from the video circuitry by a 4.5 megaHertz wavetrap coupled to the video detector output, or it may be removed after amplification in the video amplifier.

In the apparatus illustrated in FIG. 1 and FIG. 2 the composite video signal applied at the input terminal 10 is amplified in a video amplifier 11 and produced at two output connections 12 and 13. A video buffer stage 14 connected to one of the output connections from the video amplifier provides picture information for the picture tube at a video output terminal 15.

The chrominance information which is present during color transmission is removed from the composite video signal at a chrominance output terminal 16 connected to the second output connection from the video amplifier. In a color television receiver a 3.58 MHz. band-pass amplifier in the color circuitry is connected to the chrominance output terminal. In black and white television receivers the chrominance information may be removed from the composite video signal at the chrominance output terminal 16 by a low-pass filter.

The composite video signal with the chrominance information removed is applied at the input of an isolation amplifier 17. The isolation amplifier is a unity gain amplifier which isolates the composite video signal at two separate output connections 18 and 19. The isolation amplifier includes a switching arrangement for cutting off the signals at the output connections in response to a signal from a noise comparator 20 indicating the presence of noise in the composite video signal. One of the output connections 18 can be gated by signals applied at a gate input terminal 33, the purpose of which will be explained below.

The composite video signal produced at the first output connection 18 of the isolation amplifier is applied to the input of a peak detector 21. The peak detector includes a capacitance which is charged by the circuitry of the peak detector to the maximum voltage at the input; that is, to the peak voltage of the synchronizing pulses.

The composite video signal at the output of the isolation amplifier 17 is compared with the voltage stored in the capacitance of the peak detector by a synchronizing pulse comparator 22. More particularly, the voltage at the second output connection 19 of the isolation amplifier is applied directly to the first input connection to the synchronizing pulse comparator. The voltage at the second input connection 23 of the synchronizing pulse comparator from the peak detector is reduced by a voltage divider network in the peak detector so as to be less than the peak voltage of the synchronizing pulses but greater than the maximum voltage of the picture signal portion and the blanking pulses of the composite video signal. The synchronizing pulse comparator produces a pulse at the synchronizing pulse output terminal 24 when the voltage of the composite video signal applied at its first input connection 19 is greater than the voltage from the peak-detector capacitance applied at its second input connection 23. In a television receiver the synchronizing pulse output terminal 24 is connected to a low-pass filter circuit that passes only the vertical synchronizing pulses to the vertical deflection oscillator and to a high pass filter circuit that passes only the horizontal synchronizing pulses to the automatic frequency control circuit which controls the horizontal deflection oscillator.

The apparatus includes a noise cancelling arrangement including the noise comparator 20. The composite video signal at the first output connection 12 from the video amplifier 11 is applied to the noise comparator through a voltage divider so that the resulting voltage is proportional to but less than the composite video signal. The full voltage of the capacitance in the peak-detector 21 is applied at a second input connection 25 to the noise comparator. The noise comparator produces a signal at its output connection 26 when the proportionally reduced voltage from the video amplifier 11 is greater than the full voltage on the peak-detector capacitance, indicating the presence of noise in the composite video signal.

The output connection 26 from the noise comparator is connected to switching circuitry in the isolation amplifier 17 which inactivates the isolation amplifier in response to the signal from the noise comparator, thus preventing noise from affecting the voltage on the peak-detector capacitance or producing signals at the synchronizing pulse output terminal 24. The switching circuitry includes a turnoff delay arrangement such that a predetermined period of time after the start of the signal from the noise comparator the isolation amplifier will reoperate. This feature prevents the isolation amplifier from being inactivated for long periods of time, as when a permanent shift in signal level occurs.

The isolation amplifier may also include a gate having a gate input terminal 33 for gating the composite video signal at the output connection 18 to the peak detector 21. By applying a gating pulse only during horizontal flyback, that is during synchronizing pulses, additional noise protection is provided.

The apparatus may also include an AGC circuit 27. This circuit compares the full voltage on the peak detector capacitance with an external reference voltage applied at an input terminal 28 and generates an error signal at an output terminal 29 for controlling the gain of the RF and IF sections of the television receiver.

Video Amplifier

The video amplifier 11 as shown in detail in the circuit diagram of FIG. 2 is a differential feedback amplifier. The amplifier includes two NPN transistors $Q_1$ and $Q_2$ having their emitters connected together. The emitters are connected to a constant current source which includes an NPN transistor $Q_5$ biased to a fixed forward biased condition by a connection to the power supply section 31 of the apparatus.

The input terminal 10 of the apparatus, which is connected to the output of the video detector section of the television receiver, is connected to the base of transistor $Q_1$. The collector of transistor $Q_1$ is connected directly to a positive voltage source $V_{cc}$, and the collector of transistor $Q_2$ is connected to the voltage source $V_{cc}$ through a resistance $R_1$. The output from the differential arrangement of transistors $Q_1$ and $Q_2$ is taken at the collector of transistor $Q_2$ and applied to the base of an NPN emitter-follower transistor $Q_3$. Transistor $Q_3$ provides feedback to the base of transistor $Q_2$ by way of a resistance $R_3$.

A gain control terminal 32 is connected to the base of transistor $Q_2$. When the terminal is left floating, the gain of the amplifier is 1. When the terminal is connected directly to the emitter of transistor $Q_{14}$ of the power supply section 31, the gain of the amplifier is 2. The first output connection 12 from the video amplifier is taken directly from the emitter of transistor $Q_3$ and the second output connection 13 is through a resistance $R_4$.

An emitter-follower buffer stage 14 is connected between the first output connection 12 and the video output terminal 15 of the apparatus. The stage includes an NPN transistor $Q_4$ having its base connected to the emitter of transistor $Q_3$, its collector connected to the voltage source $V_{cc}$, and its emitter connected to the video output terminal 15.

The second output connection 13 is connected to the input of the isolation amplifier 17 and also to the chrominance output terminal 16. As mentioned previously, in a color television receiver the chrominance output terminal is connected to the color processing circuitry by a 3.58 MHz. band-pass amplifier. In a black and white television receiver a low-pass filter is connected to the terminal to remove the chrominance information from the composite video signal appearing at the input to the isolation amplifier.

Isolation Amplifier

Under normal video signal conditions the isolation amplifier 17 operates as a unity gain noninverting amplifier to produce isolated outputs at two output connections 18 and 19. The input of the isolation amplifier is to the base of an NPN transistor $Q_{41}$ of the differential pair of NPN transistors $Q_{41}$ and $Q_{42}$. The emitters of transistors $Q_{41}$ and $Q_{42}$ are connected together and to a constant current source including NPN transistors $Q_{40}$ and $Q_{38}$ each of which are biased to a fixed forward bias condition by connections to the power supply section 31 of the apparatus. The collector of transistor $Q_{41}$ is connected directly to the positive voltage source $V_{cc}$ and the collector of transistor $Q_{42}$ is connected to the voltage source $V_{cc}$ through resistances $R_{25}$ and $R_{24}$. The output of the differential pair is taken at the collector of transistor $Q_{42}$ through an NPN emitter-follower transistor $Q_{43}$. A feedback resistance $R_{28}$ is connected between the emitter of transistor $Q_{43}$ and the base of transistor $Q_{42}$.

The first output connection 18 from the isolation amplifier 17 to the peak detector 21 is connected to the emitter of transistor $Q_{43}$ through a resistance $R_5$. The second output connection 19, which is connected to the synchronizing pulse comparator 22, is connected to the emitter of the transistor $Q_{43}$ through a resistance $R_6$. Under normal conditions the composite video signal occurring at the input connection 13 to the transistor $Q_{41}$ will appear at the isolated output connections 18 and 19.

The isolation amplifier also includes a switching arrangement which serves to inactivate the isolation amplifier in response to a signal from the noise comparator 20 indicating the presence of noise in the composite video signal. The switching arrangement includes an NPN switching transistor $Q_{39}$ connected as a differential pair with transistor $Q_{40}$ of the constant current source to transistors $Q_{41}$ and $Q_{42}$. The collector of transistor $Q_{39}$ is connected to the juncture of resistances $R_{24}$ and $R_{25}$ in the collector circuit of the transistor $Q_{42}$ and its emitter is connected directly to the emitter of transistor $Q_{40}$ and the collector of transistor $Q_{38}$. The base of the switching transistor $Q_{39}$ is connected through a resistance $R_{23}$ to ground and through a capacitance $C_2$ to the output connection 26 of the noise comparator 20. The purpose of the resistance-capacitance arrangement will be explained hereinbelow.

Under normal conditions with no signal from the noise comparator the switching transistor $Q_{39}$ is biased to a nonconducting condition. Thus, the current flowing through transistor $Q_{38}$ flows through transistor $Q_{40}$ and is divided between transistors $Q_{41}$ and $Q_{42}$, depending upon the signal at the input connection to the isolation amplifier. When a positive-going signal occurs at the base of the switching transistor $Q_{39}$, that transistor is rendered conducting and current is switched from transistor $Q_{40}$ to that transistor. The path of current flow is from the voltage source $V_{cc}$ through resistance $R_{24}$ in the collector circuit of transistor $Q_{42}$. Thus, the voltage at the collector of transistor $Q_{42}$ and consequently at the emitter of transistor $Q_{43}$ is reduced, and the voltage level at the output connections 18 and 19 is set below zero signal output level.

The isolation amplifier also includes a gating arrangement having an input terminal 33 which may be connected to the horizontal flyback circuitry of the television receiver so as to permit a signal to appear at the first output connection 18 only during horizontal flyback. The gating arrangement includes an NPN gating transistor $Q_{44}$ connected as a differential pair with an NPN transistor $Q_{45}$. The collector of transistor $Q_{44}$ is connected directly to the emitter of transistor $Q_{43}$, its base is connected through a resistance $R_{27}$ to the gate input terminal 33, and its emitter is connected directly to the emitter of transistor $Q_{45}$. The collector of transistor $Q_{45}$ is connected directly to the first output connection 18 and its base is connected to the power supply section 31 so as to provide a fixed forward bias. The emitters of transistors $Q_{44}$ and $Q_{45}$ are connected to a constant current transistor $Q_6$ which is biased to a fixed forward bias condition by a connection to the power supply section 31.

Under normal conditions the no-signal bias voltage at the base of the gating transistor $Q_{44}$ is greater than the Fixed bias on the base of transistor $Q_{45}$ causing the current of transistor $Q_6$ to flow through transistor $Q_{44}$. When a negative-going signal at the gate input terminal 33 reduces the voltage at the base of transistor $Q_{44}$ below the fixed bias at the base of transistor $Q_{45}$, the current switches to transistor $Q_{45}$. The current then flows through resistance $R_5$ reducing the voltage at the first output connection 18 to less than zero signal voltage. The signal produced at the second output connection 19 is not significantly affected by the changes in the conduction conditions of transistors $Q_{44}$ and $Q_{45}$.

By providing a negative-going pulse at the gate input terminal 33 during horizontal flyback, the first output connection 18 is isolated from the input to the isolation amplifier during the picture signal portion of the composite video signal. Thus, the peak detector 21 is isolated from noise in the composite video signal except during horizontal flyback when the synchronizing pulses are present. The gating arrangement can be inactivated by connecting the gate input terminal to the emitter of transistor $Q_{14}$ in the power supply section 31.

Peak Detector

The peak detector 21 includes a differential amplifier arrangement for charging a charge storage capacitance $C_1$ to a voltage equal to the maximum voltage appearing at the first output connection 18 from the isolation amplifier 17; that is, to the peak voltage of the synchronizing pulses. The input to the circuit is to the base of an NPN transistor $Q_7$ having its collector connected directly to the voltage source $V_{cc}$ and its emitter connected directly to the base of an NPN transistor $Q_8$. The collector of transistor $Q_8$ is connected directly to the voltage source $V_{cc}$ and its emitter is connected directly to the emitter of an NPN transistor $Q_9$.

The emitters of transistors $Q_8$ and $Q_9$ are connected to a constant current source including an NPN transistor $Q_{13}$, a resistance $R_7$, and a diode $Q_{46}$. A fixed forward bias is applied to the base of transistor $Q_{13}$ by a connection to the power supply section 31. The collector of transistor $Q_9$ is connected through a resistance $R_8$ to the voltage source $V_{cc}$. The emitter of an NPN transistor $Q_{10}$ is connected directly to the base of transistor $Q_9$ and its collector is connected directly to the voltage source $V_{cc}$.

Two NPN emitter-follower transistors $Q_{11}$ and $Q_{12}$ are connected between the collector of transistor $Q_9$ and the capacitance $C_1$. The collectors of transistors $Q_{11}$ and $Q_{12}$ are connected directly to the voltage source $V_{cc}$ and the base of transistor $Q_{11}$ is connected directly to the collector of transistor $Q_9$. The base of transistor $Q_{12}$ is connected directly to the emitter of transistor $Q_{11}$ and its emitter is connected through a feedback resistance $R_9$ to the base of transistor $Q_{10}$ and is connected directly to one terminal of the capacitance $C_1$. The other terminal of the capacitance $C_1$ is connected directly to ground.

The circuit operates in the manner of a differential feedback amplifier to produce a signal voltage at the terminal of capacitance $C_1$ and cause current to flow into the capacitance whenever the voltage at the input of the circuit is greater than the voltage at the capacitance terminal. Under these conditions the circuit, in effect, provides a very low impedance to current flow from the voltage source $V_{cc}$ into the capacitance $C_1$. The resulting time constant with a capacitance $C_1$ of 1 microfarad is less than the width of a horizontal synchronizing pulse. Thus, the capacitance becomes charged to the voltage of the synchronizing pulses in the composite video signal in the time period of a single pulse.

Whenever the voltage at the input to the circuit is less than the charge on the capacitance $C_1$, the capacitance tends to discharge through the circuit. However, by virtue of the series connection of transistor $Q_{10}$ and transistor $Q_9$ a very small flow of current from the capacitance $C_1$ into the base of transistor $Q_{10}$ is sufficient to drive transistor $Q_9$ into saturation and thus limit the current flow. In effect, the circuit provides a high impedance to current flow from the capacitance $C_1$. Furthermore, since transistor $Q_9$ is in saturation except during the synchronizing pulses, there is a slight delay before the capacitance starts to charge after sufficient voltage is applied at the input to the circuit. This action prevents narrow spikes of noise which might get by the noise-cancelling arrangement (the operation of which will be explained hereinbelow) from affecting the charge in the capacitance $C_1$.

Two output connections are taken from the peak detector 21. The first output connection 25 is taken directly from the terminal of capacitance $C_1$ and, therefore, is at the full peak voltage of the synchronizing pulses. The second output connection 23 is from a voltage divider provided by resistances $R_{10}$ and $R_{11}$ which are connected between the terminal of the capacitance $C_1$ and the emitter of transistor $Q_{14}$ in the power supply section 31 of the apparatus. The voltage at the emitter of transistor $Q_{14}$ is the zero signal voltage and is approximately equal to $V_{cc}/2$. The resistances $R_{10}$ and $R_{11}$ are 1,000 ohms and 9,000 ohms, respectively. Therefore, the voltage at the juncture of the two resistances $R_{10}$ and $R_{11}$ is greater than the zero signal voltage by 90 percent of the peak voltage of the synchronizing pulses. Since the maximum signal voltage of the picture signal is normally about 70 percent of the peak pulse voltage, the voltage at the second output connection 23 is less than the peak synchronizing pulse voltage and greater than the maximum picture signal voltage.

Synchronizing Pulse Comparator

The synchronizing pulse comparator 22 compares the composite video signal from the isolation amplifier 17 applied at its first input connection 19 and the voltage proportional to the stored peak voltage in the capacitance $C_1$ applied at its second input connection 23 and provides a negative-going output pulse at the synchronizing pulse output terminal 24 whenever the voltage at the first input connection 19 is greater than the voltage at the second input connection 23. That is, a negative-going pulse is produced at the output terminal 24 during a synchronizing pulse.

The synchronizing pulse comparator 22 includes a cascaded emitter-follower common-base differential amplifier of two PNP transistors $Q_{19}$ and $Q_{20}$ and two NPN transistors $Q_{17}$ and $Q_{18}$. The first input to the synchronizing pulse comparator is the second output connection 19 from the isolation amplifier connected directly to the base of transistor $Q_{18}$. The second input to the synchronizing pulse comparator is the second output connection 23 from the peak detector connected directly to the base of transistor $Q_{17}$. The collectors of transistors $Q_{17}$ and $Q_{18}$ are both connected directly to the voltage source $V_{cc}$ and their emitters are connected directly to the emitters of transistors $Q_{19}$ and $Q_{20}$, respectively. The bases of transistors $Q_{19}$ and $Q_{20}$ are connected together and to a current control circuit.

The collectors of transistors $Q_{19}$ and $Q_{20}$ are connected to an output arrangement including a current source with a diode $Q_{21}$ and an NPN transistor $Q_{22}$. Diode $Q_{21}$ is an NPN transistor structure with the base shorted to the collector, and, therefore, its forward voltage drop is equal to the forward base-emitter voltage drop of a transistor operating at the same emitter current. Diode $Q_{21}$ is connected between the collector of transistor $Q_{19}$ and ground. The base of transistor $Q_{22}$ is connected to the collector of transistor $Q_{19}$, its collector is connected to the collector of transistor $Q_{20}$, and its emitter is connected to ground. An NPN output transistor $Q_{23}$ has its base connected directly to the collectors of transistors $Q_{20}$ and $Q_{22}$, its emitter connected directly to ground, and its collector connected directly to the synchronizing pulse output terminal 24.

The current control circuit for controlling the current into the bases of transistors $Q_{19}$ and $Q_{20}$ includes a PNP transistor $Q_{26}$ and an NPN transistor $Q_{27}$ arranged with the collector of transistor $Q_{27}$ connected directly to the emitter of transistor $Q_{26}$ and with the base of transistor $Q_{27}$ connected directly to the collector of transistor $Q_{26}$. The emitter of transistor $Q_{27}$ is connected directly to ground. The base of transistor $Q_{26}$ is connected through a resistance $R_{16}$ and a diode $Q_{25}$ to ground and is also connected directly to the base of an NPN transistor $Q_{24}$. Diode $Q_{25}$ is also an NPN transistor structure with the base shorted to the collector. The collector of transistor $Q_{24}$ is connected directly to the bases of transistors $Q_{19}$ and $Q_{20}$ and its emitter is connected through a resistance $R_{17}$ to ground. The emitter of transistor $Q_{26}$ and the collector of transistor $Q_{27}$ are connected to the power supply section 31 so as to provide a constant reference current into the current control circuit as will be explained hereinbelow.

Figure 3:
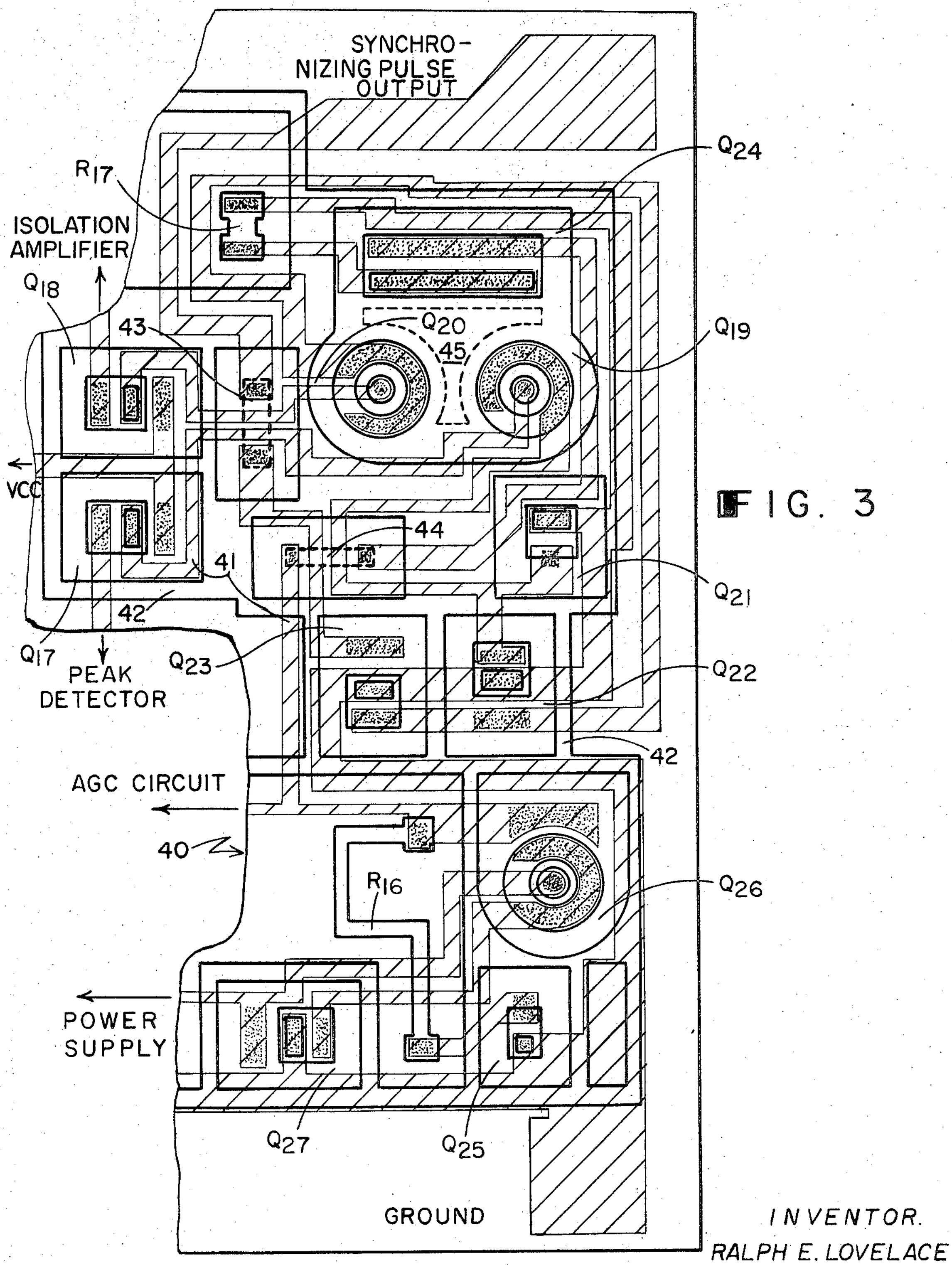
FIG. 3 is a plan view of a fragment of a wafer of semiconductor material illustrating a portion of the circuit of FIG. 2 embodied in a monolithic integrated circuit network.

FIG. 3 is a plan view of a fragment of a silicon wafer 40 containing the synchronizing pulse comparator section of the apparatus in monolithic integrated circuit form. The components are formed in the silicon wafer by the well-known processes of selective diffusion of conductivity type imparting materials through openings in oxide coatings on the surface of the wafer. In FIG. 3 the heavy lines delineate the surface boundaries between regions of silicon of different conductivity type. The light lines and crosshatching indicate the deposited metal interconnections 41 overlying the insulating silicon oxide protective coating on the surface of the wafer. The stippled areas define openings in the oxide coating at which the metal interconnections make ohmic electrical contact to the underlying silicon.

The integrated circuit network is fabricated by depositing an epitaxial layer of N-type silicon on a substrate of P-type silicon. P-type conductivity-imparting material is diffused into the surface of the N-type layer to form an interconnected pattern of P-type isolation material 42 extending to the P-type substrate and thereby providing a plurality of isolated N-type regions encircled by P-type material. P-type conductivity imparting material is then diffused into selected portions of the N-type regions to provide the bases for the NPN transistors ($Q_{17}$, $Q_{18}$, $Q_{21}$, $Q_{22}$, $Q_{23}$, $Q_{24}$, $Q_{25}$, and $Q_{27}$); the emitters and collectors of the PNP transistors ($Q_{19}$, $Q_{20}$, and $Q_{26}$); and the resistances ($R_{16}$ and $R_{17}$).

N-type conductivity imparting material is diffused into portions of the NPN transistor P-type base regions to provide the emitters for the NPN transistors. N-type material is also diffused into the N-type layer at regions 43, 44, and 45 delineated by heavy dashed lines in FIG. 3. Regions 43 and 44 are the conductive regions for interconnection crossovers. The high conductivity N-type region 45 prevents undesirable electrical interactions between different portions of the transistors $Q_{19}$, $Q_{20}$, and $Q_{24}$ which are fabricated within a single N-type epitaxial region. Remaining portions of the isolated N-type epitaxial regions provide the collectors of the NPN transistors and the bases of the PNP transistors.

As can be seen in FIG. 3 the NPN transistors are of the well-known double-diffused type, and the PNP transistors are of lateral configuration. Since similar portions of the same types of components are produced simultaneously within the monolithic silicon wafer, the depths and resistivities of the similar portions are identical. Therefore, electrical characteristics of the same types of components, for example, the betas of transistors of the same conductivity type, are closely matched regardless of the precision with which their absolute values can be controlled.

The synchronizing pulse comparator 22 operates in the following manner. When the voltage at the second input connection 23 is sufficiently greater than that at the first input connection 19, all the available current flows in the collector circuit of transistor $Q_{19}$ and none flows in the collector circuit of transistor $Q_{20}$. The total current available is determined by the current control circuit connected to the bases of transistors $Q_{19}$ and $Q_{20}$ as will be explained below. Current flows nearly equally through diode $Q_{21}$ and across the base-emitter junction of transistor $Q_{22}$. Transistor $Q_{22}$ operates in saturation establishing a low voltage at its collector. The output transistor $Q_{23}$ is thus biased to a nonconducting condition.

Under conditions of equal voltages at the bases of transistors $Q_{17}$ and $Q_{18}$, the current flowing in the collector circuits of transistors $Q_{19}$ and $Q_{20}$ are equal. A small amount of the current flow in the collector circuit of transistor $Q_{19}$ flows across the base-emitter junction of transistor $Q_{22}$. Transistor $Q_{22}$ is thereby biased to a conducting condition causing all the current available from transistor $Q_{20}$ to flow into the collector of transistor $Q_{22}$. Thus, no current is available to flow into the base of output transistor $Q_{23}$ and that transistor remains nonconducting.

When the voltage at the base of transistor $Q_{18}$ is greater than the voltage at the base of transistor $Q_{17}$, less current flows into the base of transistor $Q_{22}$ reducing current flow into its collector, and more current flows in the collector circuit of transistor $Q_{20}$. The available current thus flows into the base of the output transistor $Q_{23}$ causing that transistor to become conductive. When the voltage differential at the bases of transistors $Q_{18}$ and $Q_{17}$ is sufficient, transistor $Q_{22}$ becomes nonconducting and all the current in the collector circuit of transistor $Q_{20}$ flows into the base of output transistor $Q_{23}$ driving that transistor into high conduction.

During the picture signal portion of the composite video signal the voltage at the second input connection 23 from the peak-detector 21 is greater than the voltage at the first input connection 19 from the isolation amplifier 17. Under these conditions output transistor $Q_{23}$ is nonconducting. Thus, a relatively high voltage level is established at the output terminal 24. During the synchronizing pulse portion of the composite video signal the voltage at the first input connection 19 becomes greater than the voltage at the second input connection 23. Under these conditions output transistor $Q_{23}$ conducts heavily. Thus, a relatively low voltage level, approaching ground, is established at the output terminal 24.

The current control circuit provides a constant base current for the differential arrangement so as to assure the capability of driving the external load despite the absolute values of the transistor betas. The voltage at the collector of transistor $Q_{27}$ is clamped at a voltage set by the base-emitter junction voltage drops of transistors $Q_{24}$ and $Q_{28}$ in series. Thus, the current from the power supply 31 into the collector circuit of transistor $Q_{27}$ is fixed and serves as a reference current. (For a $V_{cc}$ of 12 volts and $R_{12}$ and $R_{13}$ of 1,500 ohms, each, the reference current is approximately 1.6 milliamperes.) This reference current and the betas of transistors $Q_{26}$ and $Q_{27}$ determine the base current of transistor $Q_{26}$.

The combination of diode $Q_{25}$, resistance $R_{16}$, transistor $Q_{24}$, and resistance $R_{17}$ causes the base current of transistor $Q_{26}$ to be multiplied by a factor which is determined by the geometries of transistor $Q_{24}$ and diode $Q_{25}$ and by the ratio of resistances $R_{16}$ to $R_{17}$. The maximum collector current in the output transistor $Q_{23}$ is dependent on the reference current and the multiplying factor, and further is proportional to the betas of NPN transistor $Q_{23}$ and PNP transistor $Q_{20}$ and inversely proportional to the betas of PNP transistor $Q_{27}$ and NPN transistor $Q_{26}$.

That is, the collector current of the output transistor $Q_{23}$ depends on the relative values of the betas of NPN transistors $Q_{23}$ and $Q_{26}$ and PNP transistors $Q_{20}$ and $Q_{27}$, not on their absolute values. The relative values of the betas of these transistors are closely matched by virtue of the transistors being fabricated within a single semiconductor wafer during the same processing steps. If the betas of the two NPN transistors $Q_{23}$ and $Q_{26}$ are equal and the betas of the two PNP transistors $Q_{20}$ and $Q_{27}$ are equal, the maximum collector current of the output transistor $Q_{23}$ is dependent on the reference current in the collector circuit of transistor $Q_{27}$ and the multiplying effect of the combination of diode $Q_{25}$, resistance $R_{16}$, transistor $Q_{24}$, and resistance $R_{17}$. The circuit design thus provides satisfactory driving capabilities for the output transistor $Q_{23}$ despite possible difficulties in controlling the absolute values of the betas of transistors $Q_{27}$, $Q_{26}$, $Q_{20}$, and $Q_{23}$.

The synchronizing pulse output terminal 24 is connected to the circuits in a television receiver which control the horizontal and vertical deflection of the electron beam in the picture tube.

Noise Comparator

The noise comparator 20 compares the composite video signal at the first output connection 12 from the video amplifier 11 with the full value of the stored peak voltage in the capacitance $C_1$ to produce an output signal at its output connection 26 when the composite video signal voltage exceeds the voltage in the capacitance by a predetermined amount. The composite video signal voltage is reduced by a voltage divider of resistances $R_{19}$ and $R_{20}$ connected between the first output connection 12 from the video amplifier and ground and applied to the base of an NPN transistor $Q_{35}$. The voltage from the capacitance $C_1$ is applied directly by the connection 25 to the base of an NPN transistor $Q_{36}$.

Transistors $Q_{35}$ and $Q_{36}$ provide a differential amplifier. The collector of transistor $Q_{35}$ is connected directly to the voltage source $V_{cc}$ and the collector of transistor $Q_{36}$ is connected through a resistance $R_{18}$ to the voltage source $V_{cc}$. The emitters of transistors $Q_{35}$ and $Q_{36}$ are connected directly to each other and to a constant current source including an NPN transistor $Q_{34}$ and a resistance $R_{21}$. Transistor $Q_{34}$ is biased to a fixed forward bias condition by a connection to the power supply section 31 of the apparatus.

The collector of transistor $Q_{36}$ is connected directly to the base of an NPN output transistor $Q_{37}$ which has its collector connected directly to the voltage source $V_{cc}$ and its emitter connected to an output connection 26 to the switching arrangement in the isolation amplifier 17. The emitter of transistor $Q_{37}$ is also connected directly to the collector of an NPN transistor $Q_{33}$ which has its emitter connected to ground through a resistance $R_{22}$ and its base connected to the power supply section 31 so as to provide fixed forward bias.

Under normal conditions with the voltage at the base of transistor $Q_{35}$ less than the voltage at the base of transistor $Q_{37}$, transistor $Q_{37}$ is nonconductive and the voltage at the output connection 26 is low. When the voltage at the base of transistor $Q_{35}$ becomes greater than that of transistor $Q_{36}$, indicating the presence of noise in the output of the video amplifier, transistor $Q_{37}$ is biased to conduction. Current flows from the emitter of transistor $Q_{37}$ through the coupling capacitance $C_2$ and into the base of the switching transistor $Q_{39}$ in the switching arrangement of the isolation amplifier 17. As explained hereinabove, when transistor $Q_{39}$ is biased to conduction, the isolation amplifier 17 is inactivated and no signal is passed from the video amplifier 11 to the two output connections 18 and 19 of the isolation amplifier 17.

While transistor $Q_{37}$ is biased to conduction the capacitance $C_2$ charges through resistance $R_{23}$. With a capacitance $C_2$ of 0.05 microfarads and a resistance $R_{23}$ of 4,000 ohms the voltage at the base of transistor $Q_{39}$ will drop to a level which cuts off conduction in transistor $Q_{39}$ and restores the isolation amplifier to normal operation after 139 microseconds. This period of time is less than the 190 microsecond period for each set of vertical synchronizing pulses in the composite video signal. Thus, the vertical synchronizing pulses cannot be cancelled by operation of the noise comparator which might occur when the television receiver is first turned on or switched from a weak channel to a strong channel.

Transistor $Q_{33}$ and resistance $R_{22}$ provide a discharging circuit for capacitance $C_2$. When the transistor $Q_{37}$ becomes nonconductive upon termination of noise in the composite video signal, the capacitance $C_2$ is rapidly discharged through transistor $Q_{33}$ cutting off conduction in switching transistor $Q_{39}$.

AGC Circuit

An AGC circuit 27 for controlling the gain of the RF and IF sections of the television receiver may also be included with the apparatus. The AGC circuit includes a differential amplifier employing two NPN transistors $Q_{31}$ and $Q_{30}$ having their emitters connected together and to a constant current source which includes an NPN transistor $Q_{32}$ having its emitter connected through a resistance $R_{28}$ to ground. The base of transistor $Q_{32}$ is connected to the base of transistor $Q_{26}$ of the current control circuit of the synchronizing pulse comparator thus biasing transistor $Q_{32}$ to a fixed forward biased condition.

The collector of transistor $Q_{31}$ is connected directly to the voltage source $V_{cc}$ and its base is connected directly to the first output connection 25 of the peak-detector 21. The collector of transistor $Q_{30}$ is connected directly to the base of a PNP transistor $Q_{29}$ having its emitter connected directly to the voltage source $V_{cc}$ and its collector connected directly to the base of an NPN transistor $Q_{28}$. The collector of transistor $Q_{28}$ is connected directly to the voltage source $V_{cc}$ and its emitter is connected to the AGC output terminal 29. The base of transistor $Q_{30}$ is connected directly to the AGC reference input terminal 28 to which is applied an AGC reference voltage of constant value.

The AGC circuit compares the full peak voltage of the synchronizing pulses as stored in the capacitance $C_1$ with a standard AGC reference voltage and produces an error signal at the output terminal 29. When the peak voltage in the composite video signal exceeds the AGC reference voltage, a negative-going signal which may be used to decrease the gain of the RF and IF sections of the television receiver is produced. The combination of transistors $Q_{29}$ and $Q_{28}$ simulates a PNP transistor and provides additional amplification of the AGC error signal.

Conclusion

Video signal-processing apparatus in accordance with the invention as described is adapted for use in either black and white or color television receivers. The apparatus (1) amplifies the detected composite video signal for driving the picture tube; (2) separates the synchronizing pulses from the composite video signal for controlling the deflection circuits; (3) generates its own noise cancelling signal to eliminate the effects of noise; and in addition (4) provides an AGC signal for controlling the gain of the RF and IF sections.

The apparatus is amenable to fabrication as a monolithic integrated circuit network within a single wafer of semiconductor material, except for capacitances $C_1$ and $C_2$ shown within dashed lines in the circuit diagram of FIG. 2. The circuit design makes use of transistors and resistances which are readily fabricated in a wafer by the well-known processes of selective diffusion. The values of the capacitances, however, are relatively large and with the present state of the art are best arranged externally of the semiconductor wafer.

While there has been shown and described what is considered a preferred embodiment of the present invention, it will be obvious to those skilled in the art that various changes and modifications may be made therein without departing from the invention as defined in the appended claims.

I claim:

1. Signal-processing apparatus including in combination input circuit means;

isolation circuit means having an input connection connected to the input circuit means and having a first output connection and a second output connection, said isolation circuit means being operable to produce a signal applied to the input connection by the input circuit means at the first and second output connections;

peak detection means connected to the first output connection of the isolation circuit means, said peak-detection means including a charge storage means and circuit means, said circuit means being operable to charge the charge storage means to the peak voltage of the signal at the first output connection of the isolation circuit means;

first comparison circuit means having a first input connection, a second input connection, and an output terminal;

means connecting the second output connection of the isolation circuit means to the first input connection of the first comparison circuit means;

means connected to the charge storage means and to the second input connection of the first comparison circuit means for providing at the second input connection a voltage proportional to and less than the voltage on the charge storage means;

said first comparison circuit means being operable to produce a first signal level at the output terminal when the voltage of the signal at its first input connection is less than the voltage at its second input connection and being operable to produce a second signal level at the output terminal when the voltage of the signal at its first input connection is greater than the voltage of the signal at its second input connection;

second comparison circuit means having a first input connection connected to the input circuit means, a second input connection connected to the charge storage means, and an output connection, said second comparison circuit means being operable to produce a predetermined signal condition at its output connection when the voltage of the signal applied to its first input connection by the input circuit means is greater than the voltage at its second input connection; and switching circuit means connected to the output connection of the second comparison circuit means and associated with the isolation circuit means, said switching circuit means being operable to prevent the signal at the input connection of the isolation circuit means from being produced at the first and second output connections of the isolation circuit means in response to the presence of the predetermined signal condition at the output connection of the second comparison circuit means.

2. Signal-processing apparatus in accordance with claim 1 wherein:

said charge storage means is a storage capacitance; and said circuit means of the peak-detection means is a differential amplifier circuit means having a first conduction condition during which current flows into said storage capacitance and a second conduction condition during which the circuit means provides a high impedance to current flow from the storage capacitance;

said circuit means of the peak-detection means being biased to operate in the first conduction condition when the voltage at the first output connection of the isolation circuit means is greater than the voltage on the storage capacitance and being biased to operate in the second conduction condition when the voltage on the storage capacitance is greater than the voltage at the first output connection of the isolation circuit means.

3. Signal-processing apparatus in accordance with claim 2 wherein said first comparison circuit means includes:

a first differential amplifier circuit means having a first conduction condition and a second conduction condition; and an output circuit means connected to the first differential amplifier circuit means and to the output terminal and being operable to produce the first signal level at the output terminal when the first differential amplifier circuit means is in the first conduction condition and being operable to produce the second signal level at the output terminal when the first differential amplifier circuit means is in the second conduction condition;

said first differential amplifier circuit means being biased to operate in the first conduction condition when the voltage of the signal at the first input connection of the first comparison circuit means is less than the voltage at the second input connection of the first comparison circuit means and being biased to operate in the second conduction condition when the voltage of the signal at the first input connection of the first comparison circuit means is greater than the voltage of the signal at the second input connection of the first comparison circuit means.

4. Signal-processing apparatus in accordance with claim 3 wherein:

said switching circuit means is operable when in a first conduction condition to permit the signal at the input connection of the isolation circuit means to be produced at the first and second output connections of the isolation circuit means and is operable when in a second conduction condition to prevent the signal at the input connection of the isolation circuit means from being produced at the first and second output connections of the isolation circuit means;

and including:

means for normally biasing the switching means to the first conduction condition; and circuit means connecting the output connection of the second comparison circuit means to the switching circuit means, said circuit means being operable to bias the switching means to the second conduction condition in response to the predetermined signal condition being present at the output connection of the second comparison circuit means and being operable to restore the switching circuit means to the normally biased first conduction condition a predetermined period of time after the predetermined signal condition appears at the output connection of the second comparison circuit means.

5. Signal-processing apparatus in accordance with claim 4 wherein:

said second comparison circuit means includes a second differential amplifier circuit means having a first conduction condition and a second conduction condition, said second differential amplifier circuit means being operable to produce a first voltage level at the output connection of the second comparison circuit means when in the first conduction condition and being operable to produce a second voltage level at the output connection of the second comparison circuit means when in the second conduction condition, and means connecting the input circuit means to the first input connection of the second comparison circuit means and the storage capacitance to the second input connection of the second comparison circuit means and being operable to bias the second differential amplifier circuit means to the first conduction condition when the voltage at the first input connection of the second comparison circuit means is less than the voltage at the second input connection of the second comparison circuit means and being operable to bias the second differential amplifier circuit means to the second conduction condition when the voltage at the first input connection of the second comparison circuit means is greater than the voltage at the second input connection of the second comparison circuit means;

said circuit means connecting the output connection of the second comparison circuit means to the switching circuit means includes a resistance-capacitance arrangement operable to bias the switching circuit means to the second conduction condition when the voltage at the output connection of the second comparison circuit means changes from the first voltage level to the second voltage level and to maintain the switching circuit means in the second conduction condition until the capacitance of the resistance-capacitance arrangement charges to a predetermined value; and said second comparison circuit means also includes means connected to the output connection of the second comparison circuit means and operable to discharge the capacitance of the resistance-capacitance arrangement when the voltage at the output connection changes from the second voltage level to the first voltage level.

6. Signal processing apparatus in accordance with claim 5 wherein said input circuit means includes:

a differential amplifier circuit means having an input connection for applying input signals thereto and being operable to produce output signals at the input connection of the isolation circuit means and at the first input connection of the second comparison circuit means.

7. Signal processing apparatus in accordance with claim 6 wherein said isolation circuit means includes:

a gating circuit means having an input terminal and being operable in response to a predetermined signal condition at the input terminal to prevent the signal at the input connection of the isolation circuit means from being produced at the first output connection of the isolation circuit means while permitting the signal to be produced at the second output connection of the isolation circuit means.

8. Video signal processing apparatus for separating the synchronizing pulses from the composite video signal in a television receiver including in combination:

an input circuit means adapted to receive a composite video signal including the picture signal and synchronizing pulses;

isolation circuit means having an input connection connected to the input circuit means and having a first output connection and a second output connection, said isolation circuit means being operable to produce the composite video signal at the first and second output connections;

peak-detection means connected to the first output connection of the isolation circuit means, said peak-detection means including a charge storage means and circuit means, said circuit means being operable to charge the charge storage means to the peak voltage of the synchronizing pulses of the composite video signal at the first output connection of the isolation circuit means;

synchronizing pulse comparator means having a first input connection, a second input connection and an output terminal;

means connecting the second output connection of the isolation circuit means to the first input connection of the synchronizing pulse comparator means for providing the composite video signal at said first input connection;

means connected to the charge storage means and to the second input connection of the synchronizing pulse comparator means for providing at said second input connection a voltage proportional to and less than the voltage on the charge storage means and greater than the maximum voltage of the picture signal portion of the composite video signal applied at the first input connection of the synchronizing pulse comparator means;

said synchronizing pulse comparator means being operable to produce a first signal level at the output terminal when the voltage of the composite video signal at its first input connection is less than the voltage at its second input connection and being operable to produce a second signal level at the output terminal when the voltage of the composite video signal at its first input connection is greater than the voltage of the signal at its second input connection;

noise comparator means having a first input connection connected to the input circuit means, a second input connection connected to the charge storage means, and an output connection, said noise comparator means being operable to produce a predetermined signal condition at its output connection when the voltage of the signal applied to its first input connection by the input circuit means is greater y a predetermined amount than the voltage at its second input connection, indicating the presence of noise in the input circuit means; and switching circuit means connected to the output connection of the noise comparator means and associated with the isolation circuit means, said switching circuit means being operable to prevent the composite video signal from being produced at the first and second output connections of the isolation circuit means in response to the presence of the predetermined signal condition at the output connection of the noise comparator means.

9. Video signal processing apparatus in accordance with claim 8 wherein:

said charge storage means is a storage capacitance; and said circuit means of the peak-detection means is a differential amplifier circuit means having a first conduction condition during which current flows into said storage capacitance and a second conduction condition during which the circuit means provides a high impedance to current flow from the storage capacitance;

said circuit means of the peak-detection means being biased to operate in the first conduction condition when the voltage at the first output connection of the isolation circuit means is greater than the voltage on the storage capacitance whereby the storage capacitance tends to become charged to the voltage of the synchronizing pulses of the composite video signal produced at the first output connection of the isolation circuit means, and being biased to operate in the second conduction condition when the voltage on the storage capacitance is greater than the voltage at the first output connection of the isolation circuit means whereby the charge in the storage capacitance does not tend to become dissipated through the circuit means when the storage capacitance has been charged to the voltage of the synchronizing pulses produced at the first output connection of the isolation circuit means and the picture signal portion of the composite video signal is being produced at the first output connection of the isolation circuit means.

10. Video signal processing apparatus in accordance with claim 9 wherein said synchronizing pulse comparator means includes:

a first differential amplifier circuit means having a first conduction condition and a second conduction condition; and an output circuit means connected to the first differential amplifier circuit means and to the output terminal and being operable to produce the first signal level at the output terminal when the first differential amplifier circuit means is in the first conduction condition and being operable to produce the second signal level at the output terminal when the first differential amplifier circuit means is in the second conduction condition;

said first differential amplifier circuit means being biased to operate in the first conduction condition when the voltage of the composite video signal at the first input connection of the synchronizing pulse comparator means is less than the voltage proportional to the voltage of the synchronizing pulses to which the storage capacitance is charged at the second input connection of the synchronizing pulse comparator means, and being biased to operate in the second conduction condition when the voltage of the composite video signal at the first input connection of the synchronizing pulse comparator means is greater than the voltage proportional to the voltage of the synchronizing pulses to which the storage capacitance is charged at the second input connection whereby the first signal level is present at the output terminal when the picture signal portion of the composite video signal is present at the first input connection of the synchronizing pulse comparator means and the second signal level is present at the output terminal when synchronizing pulses of the composite video signal are present at the first input connection of the synchronizing pulse comparator means.

11. Video signal processing apparatus in accordance with claim 10 wherein:

said switching circuit means is operable when in a first conduction condition to permit the composite video signal to be produced at the first and second output connections of the isolation circuit means and is operable when in a second conduction condition to prevent the composite video signal from being produced at the first and second output connections of the isolation circuit means;

and including:

means for normally biasing the switching means to the first conduction condition; and circuit means connecting the output connection of the noise comparator means to the switching circuit means, said circuit means being operable to bias the switching means to the second conduction condition in response to the predetermined signal condition being present at the output connection of the noise comparator means and being operable to restore the switching circuit means to the normally biased first conduction condition a predetermined period of time after the predetermined signal condition appears at the output connection of the noise comparator means, said predetermined period of time being less than the period of time of each set of vertical synchronizing pulses of the composite video signal.

12. Video signal processing apparatus in accordance with claim 11 wherein:

said noise comparator means includes a second differential amplifier circuit means having a first conduction condition and a second conduction condition, said second differential amplifier circuit means being operable to produce a first voltage level at the output connection of the noise comparator means when in the first conduction condition and being operable to produce a second voltage level at the output connection of the noise comparator means when in the second conduction condition, and means connecting the input circuit means to the first input connection of the noise comparator means and the storage capacitance to the second input connection of the noise comparator means and being operable to bias the second differential amplifier circuit means to the first conduction condition when the voltage of the composite video signal at the first input connection of the noise comparator means is less than the voltage of the synchronizing pulses to which the storage capacitance is charged at the second input connection of the noise comparator means, and being operable to bias the second differential amplifier circuit means to the second conduction condition when the voltage at the first input connection of the noise comparator means is greater by a predetermined amount than the voltage of the synchronizing pulses to which the storage capacitance is charged at the second input connection of the noise comparator means whereby the second voltage level is present at the output connection of the noise comparator means when noise having a voltage greater than the voltage of the synchronizing pulses is present in the composite video signal;

said circuit means connecting the output connection of the noise comparator means to the switching circuit means includes a resistance-capacitance arrangement operable to bias the switching circuit means to the second conduction condition when the voltage at the output connection of the noise comparator means changes from the first voltage level to the second voltage level and to maintain the switching circuit means in the second conduction condition until the capacitance of the resistance-capacitance arrangement charges to a predetermined value, the capacitance of the arrangement charging to the predetermined value said predetermined period of time after the voltage at the output connection of the noise comparator means changes from the first voltage level to the second voltage level; and said noise comparator means also includes means connected to the output connection of the noise comparator means and operable to discharge the capacitance of the resistance-capacitance arrangement when the voltage at the output connection changes from the second voltage level to the first voltage level.

13. Video signal processing apparatus in accordance with claim 12 wherein said input circuit means includes:

a differential amplifier circuit means having an input connection for applying detected composite video signals thereto and being operable to produce amplified composite video signals at the input connection of the isolation circuit means and at the first input connection of the noise comparator means.